United States Patent [19]
Vlahos

[11] 3,774,145
[45] Nov. 20, 1973

[54] STUDIO JUNCTION BOX

[75] Inventor: Petro Vlahos, Tarzana, Calif.

[73] Assignee: The Association of Motion Picture and Television Producers, Inc., Hollywood, Calif.

[22] Filed: Oct. 19, 1972

[21] Appl. No.: 299,154

[52] U.S. Cl............. 339/198 H, 339/19, 339/22 R, 339/210 R, 339/242, 339/272 R
[51] Int. Cl............................................. H01r 9/00
[58] Field of Search................ 339/19, 22 R, 22 B, 339/22 T, 198 R, 198 C, 198 E, 198 G, 198 GA, 198 H, 198 J, 198 K, 198 S, 198 P, 198 M, 198 N, 24 L, 206 R, 206 L, 206 P, 207 R, 207 S, 208, 209, 210 R, 210 M, 210 T, 263 R, 263 B, 263 E, 263 L, 263 S, 272 R, 272 B, 272 V, 214; 174/88 R, 88 S

[56] References Cited
UNITED STATES PATENTS

| | | |
|---|---|---|
| 3,717,840 | 2/1973 | Vaughan et al................ 339/198 R |
| 3,233,209 | 2/1966 | Lazar et al.......................... 339/198 |
| 3,315,219 | 4/1967 | Brinser et al.................... 339/198 R |
| 3,189,860 | 6/1965 | Lazar et al. ..................... 339/198 P |
| 3,005,180 | 10/1961 | Dreher............................... 339/198 |
| 2,924,808 | 2/1960 | Hewes et al. ...................... 339/198 |

Primary Examiner—Marvin A. Champion
Assistant Examiner—Robert A. Hafer
Attorney—Charlton M. Lewis

[57] ABSTRACT

Each junction box assembly comprises a portable stack of rigidly assembled housing units, one for each cable conductor, typically molded of plastic with individual recesses for the respective cable conductors. Internally interconnected bus-bar formations for receiving the presently used connection lugs are mounted deeply within the respective recesses beyond reach of an inserted finger. Side openings too small for insertion of a finger admit an insulated tool for operating the lug clamping screws.

5 Claims, 7 Drawing Figures

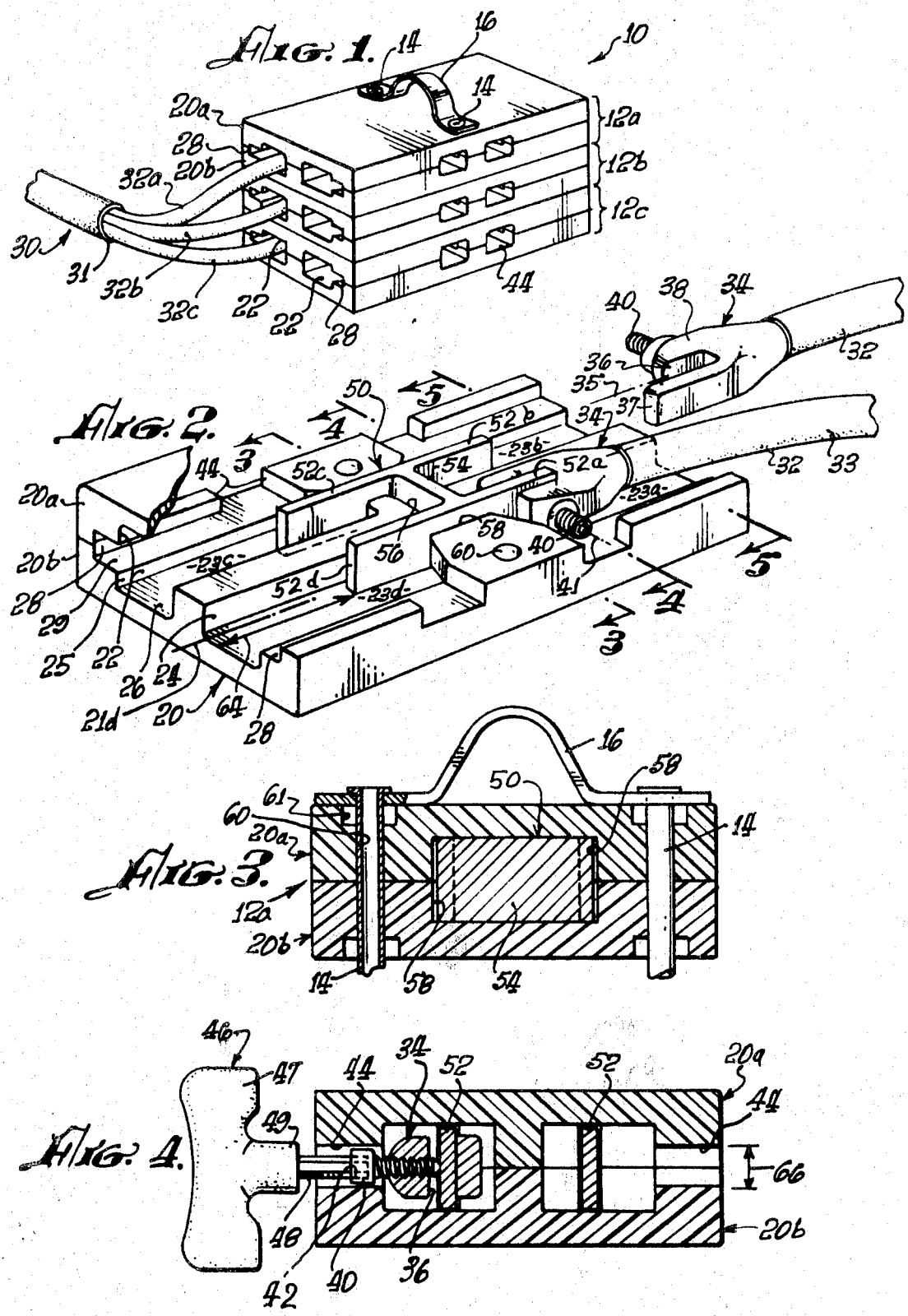

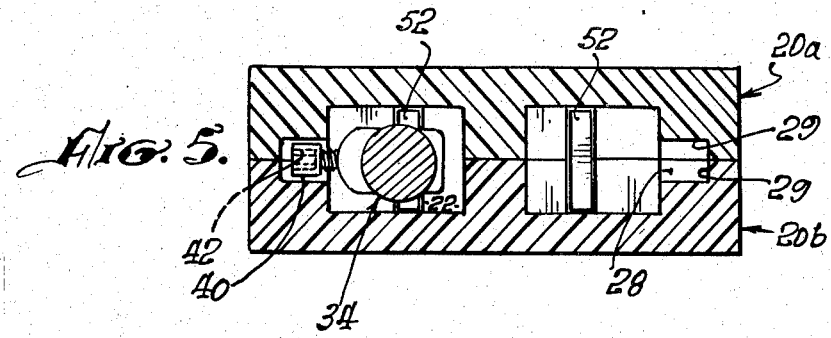
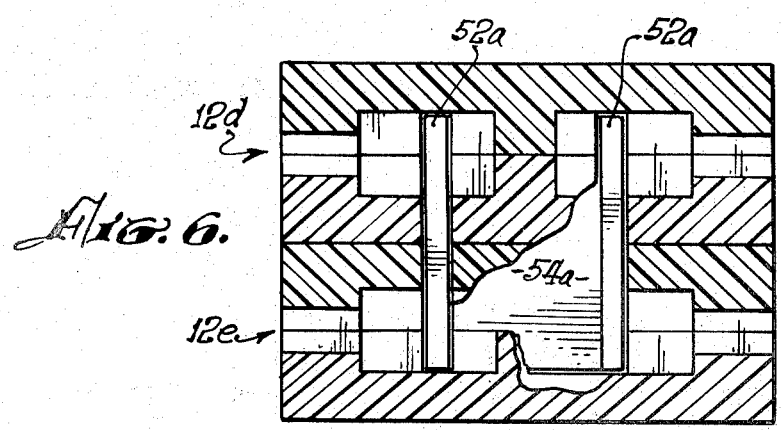
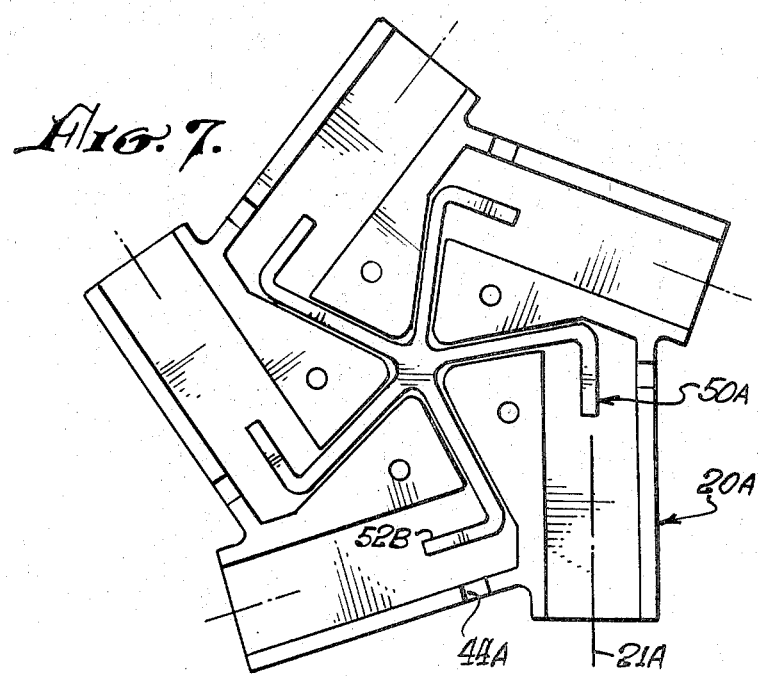

STUDIO JUNCTION BOX

This invention has to do with improved junction box structures for making temporary connections between the electrical power cables that are used on motion picture sets and the like for supplying electrical power to lights and other equipment.

It is well known that motion picture photograph requires great flexibility in position and movement of many different types of apparatus, including high wattage lamps for illuminating the set. Electrical power is ordinarily supplied to such apparatus via flexible, heavily insulated, multiple-conductor cables which can be laid directly on the ground and shifted conveniently as the units are moved about.

Such power cables are normally provided in sections either 50 or 100 feet long. The insulated individual conductors of each cable are separated for a foot or two at both cable ends and carry individual, permanently mounted connection lugs. Each lug is axially slotted to slip over a blade-like bus-bar, to which it is clamped by a screw that is threaded in one lug arm and can be tightened against the bus-bar with pliers or a wrench. In conventional practice, such cables are connected together by means of splicing blocks, each comprising several vertical copper strips or bus-bars, one for each conductor, mounted in spaced relation in a wooden frame that is open at the front and rear to provide access to the bus-bars. Each bus-bar is long enough to receive connection lugs of several different cables, facilitating connection cables in fan-out patterns. Wooden barrier strips between adjacent bus-bars leave space for manual operation of the clamping screws while guarding against accidental shorting of two live bars.

A primary object of the present invention is to provide an improved portable junction box structure for connecting power cables of the described type. In particular, it is desired to provide a junction box capable of accepting the present type of connection lugs with little or no change, so that the very large number of presently available power cables can be used efficiently.

A further object of the invention is to provide such a junction box structure which permits cables to be connected and disconnected conveniently and rapidly, while affording greatly improved safety both for the operators and for other persons in the vicinity. In particular, it is desired to enable operators to remain safely insulated from live surfaces while connecting and disconnecting cables. Moreover, it is desired to provide a structure which has no live surfaces that could be touched accidentally by a person not familiar with the apparatus, such as a child, for example, who might explore a connection box while it is in use by a motion picture company on location.

A further object of the invention is to provide a junction box for the described purpose that is smaller in size, lighter in weight and more economical to produce than previously available devices.

Those and other objects of the invention have been accomplished by constructing the junction box assembly of molded plastic with separate recesses or chambers for insertion of each of the connection lugs. A suitable connection blade is accurately mounted within each opening, selected blades being permanently interconnected within the housing to form bus-bar structures. Separate side openings are provided for each chamber for admitting an insulated tool for clamping inserted lugs to their bus-bar blades.

The lug recesses in the housings are made deep enough to fully enclose an inserted lug and a portion of its insulated conductor, preferably before the lug contacts the connection blade. There is then no need and little possibility for the operator to touch a live lug. The depth of each lug recess also insures that a finger inserted into an empty recess cannot reach the blade. The side openings for tool insertion are made too small for insertion of a finger. Thus all openings are either too deep or too small to permit a hand or finger to contact a live electrical surface.

Each connection box is preferably formed of several generally flat, stackable housing units, one for each conductor of the electrical circuit. All lug recesses of each housing unit then pertain to the same circuit wire, and the connection blades in all such openings can be permanently connected together by structure that is fully enclosed within the housing unit. Two such housing units can be physically assembled for use in connecting two-wire circuits, three units for three-wire circuits, and four units for four-wire circuits such as three-phase alternating current circuits that employ a separate ground wire. Provision may also be made for assembling four or five housing sections in which two adjacent sections have their bus-bars interconnected. Such structures permmit double the number of lugs to be connected to the neutral leg of three-wire circuits such as 120-neutral-120 alternating current circuits, for example, producing more efficient fan-outs of single phase power from such circuits. It is intended that a variety of such combinations of housing sections would be factory-assembled and made available for immediate use as required. However, an advantage of the described structure is that special requirements can be satisfied readily by hand-assembling spare housing units, or even by assemblies as needed.

Correct connection of cables to the junction boxes of the invention is facilitated by color codeing the housing sections and the lugs of the respective cables in accordance with electrical standards for circuits of various types.

A full understanding of the invention, and of its further objects and advantages, will be had from the following description of certain illustrative manners in which it may be carried out. That description is to be read with reference to the accompanying drawings, in which:

FIG. 1 is a schematic perspective representing a junction box assembly in accordance with an illustrative form of the invention;

FIG. 2 is a schematic perspective representing a single housing element at enlarged scale with the cooperating bus-bar element in position and showing two illustrative cable conductors and connection lugs;

FIGS. 3, 4 and 5 are sections of a housing unit in the respective aspects indicated by the lines 3—3, 4—4 and 5—5 of FIG. 2, with a connection lug in place and with an illustrative tool in operating position in FIG. 4;

FIG. 6 is a section similar to FIG. 4 but representing a pair of dual housing units; and FIG. 7 is a plan representing a housing element and bus-bar element in accordance with a modified form of the invention.

An illustrative junction box assembly 10 in accordance with the invention is shown in schematic perspective in FIG. 1, with a single three-conductor cable 30 connected to it. Assembly 10 comprises the three housing units 12a, 12b and 12c, which are releasably secured together in stacked relation, as by the tubes 14 with flared ends, to form a rigid assembly with the carrying handle 16. Similar assemblies may be formed of any desired number of units, that number generally corresponding to the number of conductors in the cables to be connected. As indicated in FIG. 1, the main body of each multiple conductor cable 30 is enclosed by the heavy insulated sheathing 31. At the cable ends the individual conductors 32 project from that sheating as heavy gauge but relatively flexible wires covered by the insulation 33. Each cable may include from two up to four or more individually insulated conductors, depending upon the requirements of the circuit in which they are to be used.

Each individual conductor 32 carries at its end a connection lug 34, permanently mounted as by soldering. Each lug comprises an elongated casting of copper or other highly conductive metal axially slotted at 36 to form two parallel legs 37 and 38 adapted to receive between them a blade-like bus-bar formation. A clamping screw 40 is threaded in leg 38 on a screw axis 41 perpendicular to the lug axis 35 and to the plane of slot 36 for clamping the lug firmly in conductive relation to an inserted bus-bar. Screw 40 is preferably of hexagonal socket head type, with a socket 42 (FIG. 4).

In the present illustrative form of the invention, each housing unit 12 comprises two housing elements 20a and 20b, which are typically molded of a suitable electrically insulative material such as a conventional thermoplastic. Elements 20a and 20b are preferably identical in form and are assembled in face to face relation and secured together in any desired manner, typically by the same fastening elements 14 which serve to assemble several housing units 12 to form a junction box assembly. The opposing faces of each pair of housing elements 20 are channeled to form four elongated chambers 22 opening inwardly from the ends of the housing unit, two at each end, on mutually parallel axes 21, for receiving the conductor ends and their connection lugs. The four chambers 22 of each housing unit contain bus-bar formations which are internally connected together, so that the respective conductors installed in those chambers are electrically interconnected.

As indicated in FIG. 1, the several conductors 32a, 32b and 32c of a multiple conductor cable 30 are normally inserted in corresponding chambers of respective housing units 12a, 12b and 12c. Cable 30 in FIG. 1 may be considered, for example, to have its other end connected to a power source of three-phase alternating current, or of direct current with a separate conductor for ground connection. Such power may then be distributed to up to three feeder cables by connecting their input ends to junction box 10, each cable utilizing a set of corresponding chambers 22 in the respective housing units. Correct connection is insured by applying distinctive colors of a recognized color code to the respective cable conductors and to the housing units to which they are to be connected. Each junction box is conveniently portable with or without connected cables, aNd can be stored compactly when not in use.

Each chamber-forming channel 23 is typically of generally rectangular cross section, with a flat bottom wall 26 parallel to the plane of the housing unit and with the inner and outer side walls 24 and 25. The channels are so dimensioned that the resulting chamber 22 will receive freely an inserted connection lug 34. A longitudinal side channel 28 is formed in the outer side wall of each chamber 22 by the shelf formations 29. Those side channels accommodate the projecting heads of lug clamping screws 40, and prevent insertion of a lug into chamber 22 except in proper orientation, as shown best in FIGS. 4 and 5. Lateral openings 44 through the chamber side walls near the inner ends of the side channels provide access for a tool to the clamping screw of a fully inserted lug 34.

A typical tool is shown at 46 in FIG. 4, comprising the handle 47 which is molded of an electrically insulative plastic and is effectively integrated with the metal shank 48. At least the end portion of shank 48 is hexagonal section, adapted to fit operatively the socket 42 of lug clamping screw 40. With suitable dimensioning of the hub portion of the handle at 49, the operator is protected from accidentally touching shank 48 once it has entered aperture 44 far enough to engage screw 40.

The bus-bar structure of the present embodiment comprises a unitary member 50 of general H-shape, having four symmetrically placed blade formations 52a to 52d which extend axially into the respective chambers 22a to 22d at their inner ends in planes perpendicular to the plane of the housing unit. Member 50 is typically constructed by cutting transverse sections from an aluminum or copper extrusion of symmetrical channel form having four flange portions which form the blade formations 52 and having a blade-connecting web portion 54. The housing elements 20a and 20b of each pair are formed with the two opposing abutments 56, which receive between them the web portion 54 of the bus-bar member to define the position of the latter longitudinally of chamber axes 21. The bus-bar position transverse of those axes and in the plane of the housing elements is defined by the two opposing housing abutments 58, which engage the outer flange faces adjacent the web ends (FIGS. 2 and 3). The bus-bar member is dimensioned longitudinally of its extrusion axis to fit freely between the opposing channel bottom walls 26 when the housing elements are assembled. Those walls in combination with abutments 56 and 58 thus fully define the bus-bar member within the housing unit, facilitating rapid and convenient assembly of each housing unit. That definition may be made highly accurate if desired by suitable dimensioning of the parts. However, in general it has been found sufficient, and even preferable, to permit limited freedom of movement of the bus-bar member within the housing unit. That has the further advantage that dimensional tolerances may be correspondingly relaxed.

The same boss structure that forms abutments 58 also provides strong support for the two holes 60, which receive the fastening elements 14. Those holes are provided with counterbores 61 in the flat faces of all housing elements, forming recesses for the spun ends of sleeves 14 at the bottom of each housing stack while maintaining interchangeability of the housing elements.

An important aspect of the present invention is the provision of chambers 22 that are axially deep enough to enclose the entire lug 34 and a portion of the insulated conductor 32 at least when fully installed, and preferably before the entering lug touches the outer edge of bus-bar blade 52. With that arrangement, after connection of a live conductor to the bus-bar of a housing unit, additional conductors can be inserted in other chambers of that unit without possibility of the operator's hand touching a live lug. Also, the described dimensioning places the bus-bar blade deep enough within the chamber so that a finger inserted into the chamber cannot reach the bus-bar. Both of those objectives are accomplished with reasonable certainty by making the dimension designated at 64 in FIG. 2 at least about 3 ½ inches.

Also, the tool apertures 44 are made small enough to prevent insertion of a finger via that path to touch the side of the bus-bar blade. Apertures 44 are preferably made relatively wide in the direction parallel to chamber axes 21 to insure convenient operation of the clamping screws on lugs of somewhat variable dimensions. But strict limitation of the transverse dimension of apertures 44 is sufficient to guard against insertion of a finger. For that purpose the dimension designated at 66 in FIG. 4 is made less than about three-eighths inch. With the depth of chambers 22 and the width of apertures 44 both meeting the above described limitations, a person not acquainted with electrical apparatus who might idly explore the structure of a junction box assembly while it is in use cannot accidentally touch a live surface.

FIG. 6 is a section similar to FIG. 4, but omitting the inserted connection lug and representing a dual housing section which comprises two housing units 12d and 12e in which all bus-bar blades are connected together. That is accomplished by providing a single section of the above described bus-bar extrusion that is long enough to supply the blade formations for two adjacent housing units, and by milling or otherwise forming channels through the adjacent walls of the respective units for insertion of the extrusion section. Two of the four continuous blades of the bus-bar section are shown in FIG. 6 at 52a, and the housing structure is broken away to show also the continuous web portion of the bus-bar section at 54a.

Such an interconnected pair of housing units can be assembled with any required number of single housing units to form a junction box assembly. Although the dual bus-bar configuration is not inherently distinguishable visually, its presence can be seen at a glance if conventional color coding is used, since both housing units of the dual section will carry the same color. For example, in fanning out a three-wire 120-neutral-120 circuit to provide several single phase 120-volt circuits, a junction box assembly is preferably provided with a dual housing section for the nuetral conductors, and a single housing unit for each of the other conductors. The two housing units for the neutral conductors would both typically be colored white, showing at once that a neutral conductor may be connected arbitrarily in a chamber of either one of those units. Such a junction box assembly can thus serve up to six branch lines, each comprising a two-conductor cable and carrying 120 volts.

FIG. 7 illustrates a modified housing element in accordance with the invention, designed to receive five conductors rather than the four conductors of the previously described embodiment. The housing element 20A corresponds generally in function to the element 20 of FIG. 2. However, the recesses for receiving conductors are arranged on axes 21A in a common plane but non-parallel. Bus-bar element 50A has five flanges arranged symmetrically about a center, providing connection blades 52A that project axially into the respective chambers at their inner ends. Apertures 44A are provided for access of a tool, which may be generally similar to tool 46 already described. If FIG. 7 is assumed to represent the lower housing element of a typical housing unit, the upper housing elements will appear as mirror images of FIG. 7. Hence two molds are required to produce junction boxes of the type shown in FIG. 7, whereas only a single mold is required for the previously described form.

It will be understood that many modifications can be made in the embodiments of the invention that have been described without departing from the essence of the invention.

I claim:

1. Safety mechanism for releasably interconnecting a plurality of multiple-conductor electrical power cables for temporarily supplying electrical power to portable apparatus on motion picture sets and the like, said cables including a plurality of insulated conductors the end portions of which are separated and carry individual, axially elongated connection lugs which are axially slotted to embrace blade-like bus-bars and which have clamping screws threaded in one lug arm, said mechanism comprising a plurality of flat, stackable housing units of electrically insulative material, each having a plurality of elongated interior coplanar recesses. opening axially to the exterior of said unit, each recess having a transverse section shaped to freely receive an inserted connection lug, and being deep enough to enclose an inserted lug and a portion of the insulated conductor connected thereto, bus-bar structure of electrically conductive material within each housing unit, said structure including a plurality of rigid blades which are integrally interconnected and which project axially into the respective recesses in position to enter the slot of an inserted lug, each blade terminating at least about 3 ½ inches inwardly of the recess mouth, an aperture through the side wall of each recess and opening to the exterior of said unit in position to admit a tool for operating the screw of an inserted lug to clamp the same to the blade, the aperture having at least one transverse dimension less than about three-eighths inch, and means for assembling the housing units to form a rigid assembly containing a number of units equal to the number of conductors in each cable to be connected.

2. Mechanism according to claim 1, and in which each housing unit comprises two like housing elements in face to face engagement, channeled on their opposing faces to form said recesses and apertures.

3. Mechanism according to claim 1, and in which said bus-bar structure comprises a unitary metal extrusion having a uniform cross section in the plane of the housing unit.

4. Mechanism according to claim 1, and in which each housing unit is generally rectangular, with two of said recesses opening inwardly on mutually parallel axes from each of two opposite sides of the rectangle, said bus-bar structure comprising a unitary metal extrusion having a uniform cross section of H-form in the plane of the housing unit.

5. Mechanism according to claim 1, and in which each housing unit is of generally pentagonal form with one of said recesses opening inwardly from each of the sides of the pentagon and generally parallel and closely adjacent a neighboring side of the pentagon.

* * * * *